United States Patent [19]

Yokota et al.

[11] Patent Number: 4,666,387

[45] Date of Patent: May 19, 1987

[54] PRESS APPARATUS FOR MAGNETIC INJECTION MOLDING MACHINES

[75] Inventors: Akira Yokota; Masashi Kato; Katsuhiro Fujii, all of Hiroshima, Japan

[73] Assignee: The Japan Steel Works, Ltd., Japan

[21] Appl. No.: 789,248

[22] Filed: Oct. 18, 1985

[30] Foreign Application Priority Data

Oct. 18, 1984 [JP] Japan .................. 59-156468[U]

[51] Int. Cl.$^4$ .......................................... B29C 13/00
[52] U.S. Cl. .................................... 425/3; 100/918;
164/148.1; 279/1 M; 403/DIG. 1; 425/174;
425/182; 425/192 R; 425/193; 425/406
[58] Field of Search ............... 425/174, 174.4, 3, 575,
425/576, 190, 174, 182, 190, 192 R, 193, 906,
908, 451.9, 542; 264/108; 100/918; 403/DIG.
1; 279/1 M; 164/148.1

[56] References Cited

U.S. PATENT DOCUMENTS

| | | | |
|---|---|---|---|
| 3,135,028 | 6/1964 | Schiffman et al. | 164/148.1 |
| 3,234,598 | 2/1966 | Quinn | 425/3 |
| 3,530,551 | 9/1970 | Haes et al. | 425/3 |
| 3,806,296 | 4/1974 | Aoki | 425/576 |
| 3,830,613 | 8/1974 | Aoki | 425/575 |
| 3,993,787 | 11/1976 | Nakabayashi et al. | 425/575 |
| 4,205,950 | 6/1980 | Süss et al. | 425/575 |

FOREIGN PATENT DOCUMENTS

| | | | |
|---|---|---|---|
| 0084640 | 6/1980 | Japan | 264/108 |
| 0143312 | 8/1984 | Japan | 425/3 |
| 450635 | 11/1974 | U.S.S.R. | 164/148.1 |

*Primary Examiner*—Willard E. Hoag
*Attorney, Agent, or Firm*—Sughrue, Mion, Zinn, Macpeak, and Seas

[57] ABSTRACT

A press apparatus for magnetic injection molding machines in which only the portion of a movable table in close contact with a lower metal mold is made ferromagnetic material and the other portion of the movable table is made of non-magnetic material, thereby fully utilizing the magnetic flux generated by magnetic coils with high efficiency and reducing the magnetic resistance of the magnetic circuit.

4 Claims, 6 Drawing Figures

PRESS APPARATUS FOR MAGNETIC INJECTION MOLDING MACHINES

BACKGROUND OF THE INVENTION

1. Field of the Invention

The present invention relates to a press apparatus used for magnetic injection molding machines, and more particularly to a press apparatus of the vertical type using a movable table.

2. Prior Art of the Invention

In a conventional press apparatus for magnetic injection molding machines of the vertical type using a movable table such as a rotary table and a slide table, there are three types of the press apparatus used for magnetic injection molding machines. The first type has a metal mold surrounded by an annular magnetic coil for producing magnetic flux, the second type has a press surrounded by an annular magnetic coil for producing magnetic flux and the third type has a platen surrounded by an annular magnetic coil for producing magnetic flux.

In the case of the first type, it is necessary to provide the magnetic coil not only at the upper metal mold but also the lower metal mold mounted on a movable table, therefore the wiring of wires for supplying electric power to the coil movable together with the movable table becomes very complex and further it becomes undesirably necessary to provide a plurality of coils of equinumber to the number of the lower metal molds provided on the movable table thereby increasing the cost of the injection molding machine. In the case of the second type, the whole dimension of an injection molding machine becomes bulky and complex and it is necessary to move the magnetic coils by using hydraulic equipment exclusively used for moving the magnetic coils whenever a molded work piece is removed from the metal mold. Furthermore, it is necessary to use an expensive non-magnetic steel for tie bars in order that the tie bars disposed at the inner side of the magnetic coil do not serve to form a portion of a magnetic circuit.

The above mentioned drawbacks are eliminated in the case of third type, as shown in FIG. 6, in which annular magnetic coils 54 and 56 are respectively disposed at the periphery portion of the projected portions 50a and 52a of an upper metal mold 50 and a lower metal mold 52. In the case of a rotary table 58 made of ferromagnetic material, however, there is undesirably produced a magnetic circuit having the magnetic flux flow passing through the rotary table 58, the projected portion 52a and the lower metal mold 52 as shown by an arrow 60 in FIG. 6, thereby undesirably decreasing the magnetic flux to be utilized for the upper and lower metal molds. Furthermore, in the case of the rotary table 58 made of non-magnetic material, the flow of the magnetic flux is undesirably reduced by the non-magneteic rotary table 58 thereby increasing the magnetic resistance or reluctance of the magnetic circuit and decreasing the efficiency of the magnetic field.

SUMMARY OF THE INVENTION

An object of the present invention is to eliminate the above mentioned drawbacks in the conventional press apparatus for magnetic injection molding machines, and to present a press apparatus for magnetic injection molding machines in which a magnetic field generated by a magnetic coil is fully utilized for metal molds and the efficiency of the magnetic field is maintained.

According to the present invention, only the portion of a movable table such as a rotary table and a slide table, which is required for forming the flow of a magnetic flux in a normal magnetic circuit, is made of ferromagnetic material, and the other portion of the movable table is made of non-magnetic material. In brief, only the portion of a movable table closely contacted with a metal mold is made of ferromagnetic material in contrast to the other portion made of non-magnetic material.

According to the above mentioned construction of the movable table, there is provided a predetermined magnetic circuit in the path of a lower platen→the ferromagnetic portion of a movable table→a lower metal mold→an upper metal mold→an upper platen→a tie bar→the lower platen. Since the ferromagnetic portion of the movable table and the tie bar are magnetically insulated by the non-magnetic portion of the movable table, no magnetic flux flows from the movable table into the tie bar thereby effectively utilizing the magnetic flux for the metal mold and preventing the magnetic circuit from increasing an magnetic resistance.

DETAILED DESCRIPTION OF THE PREFERRED EMBODIMENTS

Figure 1:
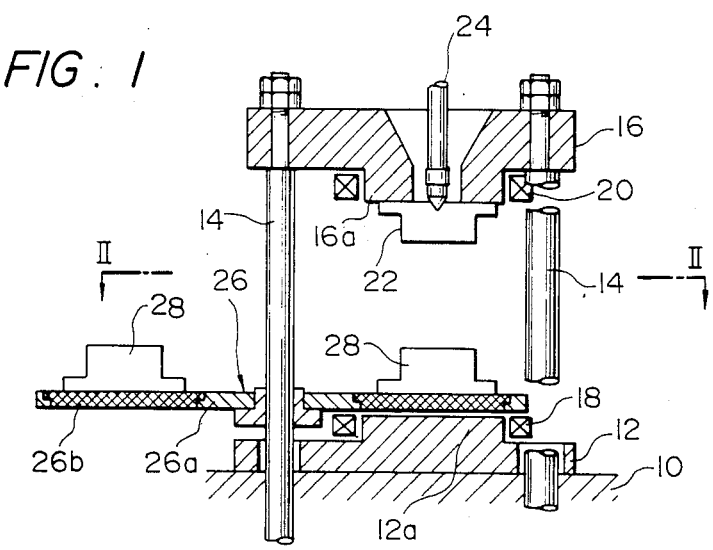
FIG. 1 is a plan view showing a press apparatus for magnetic injection molding machines as a first embodiment of the present invention.
Figure 2:
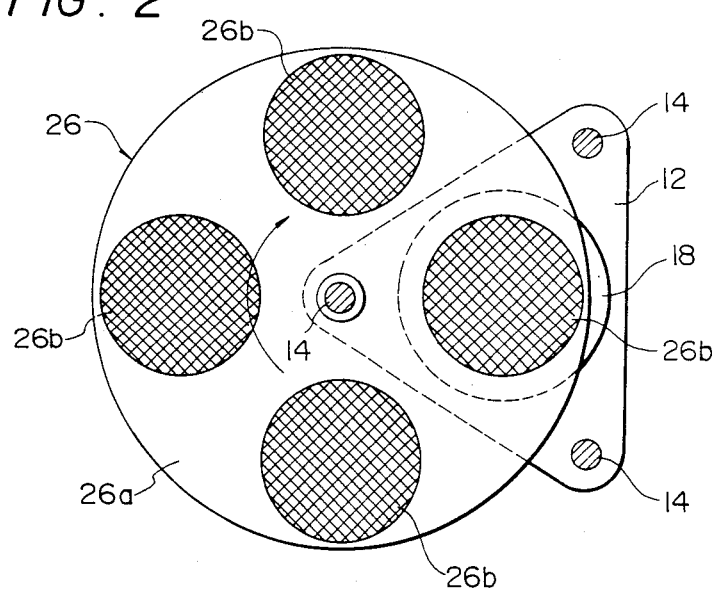
FIG. 2 is a schematic plan view taken along the line II—II in FIG. 1.
Figure 3:
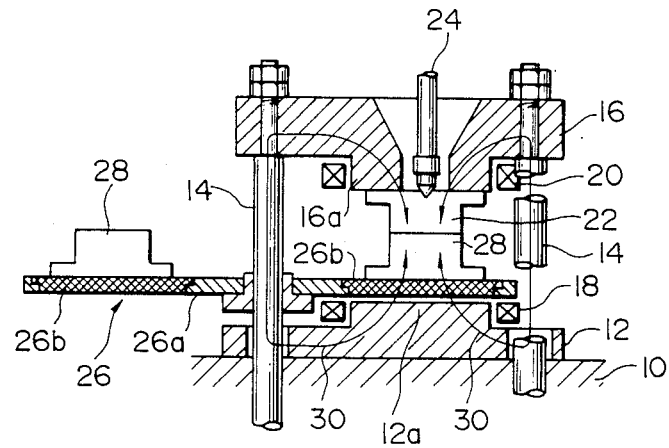
FIG. 3 is a view showing the flow of a magnetic flux in the press apparatus shown in FIG. 1.

Referring now FIGS. 1 to 3 a first embodiment of the present invention is explained. In FIG. 1 a lower platen 12 is mounted on a bed 10 and an upper platen 16 is supported opposite to the lower platen 12 by three tie bars 14. The upper platen 16 may be moved upwardly and downwardly by using a hydraulic cylinder (not shown). There are provided projected portions 12a and 16a respectively projected from the lower and upper platens 12 and 16, and the projected portion 12a is arranged to be opposite to the projected portion 16a. Furthermore, there are provided annular magnetic coils 18 and 20 surrounding the projected portions 12a and 16a, respectively. An upper metal mold 22 is mounted on the lower surface of the projected portion 16a. A molten resin may be injected from an injection cylinder 24 into the upper metal mold 22. The lower platen 12, upper platen 16, the bars 14 and upper metal mold 22 are made of ferromagnetic material. A rotary table 26 is rotatably mounted around one of three tie bars 14 as shown in FIG. 2. The rotary table 26 is constituted such that four ferromagnetic portion 26b are respectively fitted to four holes within a non-magnetic portion 26a, and four metal molds 28 are respectively placed on the four ferromagnetic portions 26b. The lowr metal mold 28 is made of ferromagnetic material.

In operation of the first embodiment of the present invention, a current is made to flow into the magentic coils 18 and 20 to produce an equidirectional magnetic flux. As a result, a magnetic flux 30 flows in the path of the projection 12a of the lower platen 12→the ferromagnetic portion 26b of the movable table 26→the lower metal mold 28→the upper metal mold 22→the projected portion 16a of the upper platen 16→the upper platen 16→the tie bar 14→the lower platen 12, as shown in FIG. 3. By this magnetic flux 30, the work piece is effected with a magnetic orientation. After a molding operation, the upper and lower metal molds 22 and 28 are opened and the rotary table 26 is rotated by 90° thereby placing the next lower metal mold 28 at the position opposite to the upper metal mold 22. With respect to the other lower metal molds, usual operations such as an insertion of inserting pieces and a removal of a molded work piece are effected.

As mentioned above, only the portion of the rotary table 26 in close contact with the lower metal mold 28 is made of ferromagnetic material, and the other portion of the rotary table 16 is made of non-magnetic material, therefore no flow of the magnetic flux is produced between the rotary table 26 and the tie bar 14. Therefore the magnetic flux 30 generated by the magnetic coil is fully utilized for the work piece (not shown) through the upper and lower metal molds 22 and 28 with high efficiency. Furthermore, the magnetic flux 30 passes through the ferromagnetic portion 26b of the rotary table 26, therefore the magnetic resistance is reduced and an efficiency of the magnetic field is well maintained.

Figure 4:
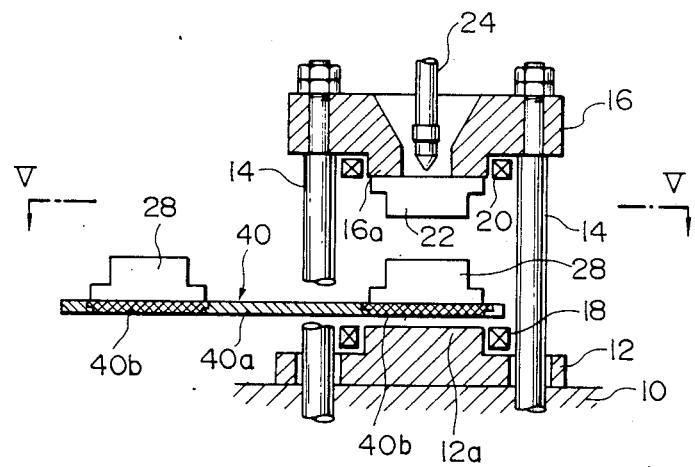
FIG. 4 shows a press apparatus as a second embodiment of the present invention.
Figure 5:
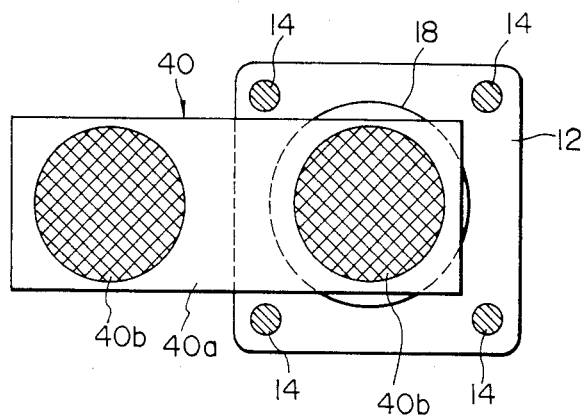
FIG. 5 is a schematic plan view taken along the line V—V in FIG. 4.
Figure 6:
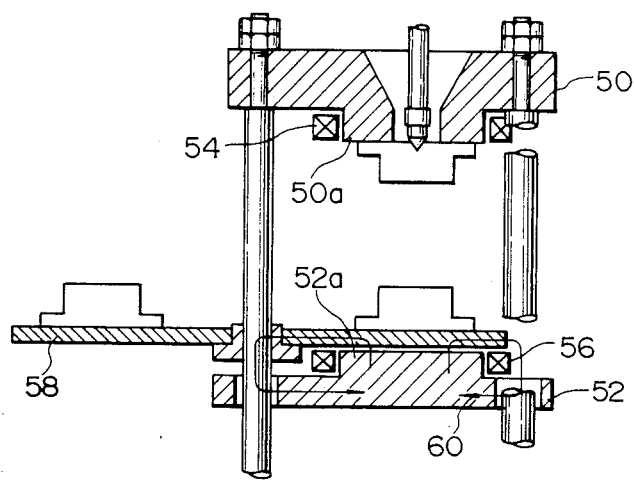
FIG. 6 is a plan view showing a conventional press apparatus for magnetic injection machines.

Referring now to FIGS. 4 and 5 a second embodiment of the present invention is explained. The second embodiment relates to a press apparatus of the slide table type. In FIGS. 4 and 5, the same or equivalent parts as that used in FIGS. 1 to 3 showing the first embodiment are denoted by the same reference numerals. In FIGS. 4 and 5 a slide table 40 is composed of a non-magnetic portion 40a and a ferromagnetic portions 40b. As is similar to the first embodiment, only the ferromagnetic portions 40b are in close contact with the lower metal mold 28 thereby producing an efficient magnetic flux passing through a ferromagnetic portion 40b.

As mentioned above, according to the present invention, only the portion of a movable table such as a rotary table and a slide table, which is in close contact with a lower metal mold is made of ferromagnetic material, and the other portion of the movable table is made of non-magnetic material. Therefore, the magnetic flux generated flows through the molds and a work piece with high efficiency.

While the present invention has been particularly described with reference to specific embodiments thereof, it is to be understood that the words which have been used are words of description rather than limitation and that changes may be made within the purview of the appended claims without departing from the true scope and spirit of the present invention in its broader aspects.

We claim:

1. A press apparatus for magnetic injection molding machines comprising; an upper platen having a projecting portion, a lower platen having a projecting portion, said projecting portion of said upper platen being opposite to said projecting portion of said lower platen, magnetic coils surrounding said projecting portions of said upper and lower platens respectively, an upper metal mold mounted on the lower surface of said projecting portion of said upper platen, a table movable between said upper metal mold and said projecting portion of said lower platen, at least one lower metal mold placed on said movable table for movement into underlying alignment with said upper metal mold, the improvement wherein only the portion of said movable table in close contact with said at least one lower metal mold is made of ferromagnetic material and the other portion of said movable table is made of non-magnetic material, whereby; a magnetic circuit of low magnetic resistance is created through said portion of said movable table in close contact with said at least one lower metal mold to increase the efficiency of the magnetic field during magnetic injection molding.

2. A press apparatus for magnetic injection molding machines according to claim 1, wherein said upper platen is supported by a plurality of vertical tie bars and said movable table is rotatably mounted around one of said tie bars and said table comprises circumferentially spaced ferromagnetic portions separated by non-magnetic material, and said at least one lower metal mold consists of a plurality of lower metal molds centered respectively on said circumferentially spaced ferromagnetic portions, whereby said lower metal molds may be stepped sequentially by rotation of said table into a position of alignment with said upper metal mold.

3. A press apparatus for magnetic injection molding machines according to claim 1, wherein said movable table is slidably mounted and includes plural, longitudinally spaced ferromagnetic portions separated by non-magnetic material, wherein said at least one lower metal mold consists of plural lower metal molds placed on said movable table at positions respectively overlying said longitudinally spaced ferromagnetic portions such that by sliding said movable table, said lower metal molds are sequentially positioned in alignment with upper metal mold mounted on the lower surface of the projecting portion of said upper platen.

4. A press apparatus for magnetic injection molding machines according to claim 1 wherein said upper platen is supported by a plurality of vertical tie bars, and wherein the magnetic flux generated said magnetic coils flows into the path of said projecting portion of said lower platen, said ferromagnetic portion of said movable table, said at least one lower metal mold, said upper metal mold, said projecting portion of said upper platen, said upper platen, a tie bar and said lower platen.

* * * * *